United States Patent [19]

Woods

[11] 4,132,429
[45] Jan. 2, 1979

[54] COLLAPSIBLE STROLLER
[76] Inventor: Rosalind G. Woods, 1050 Carmona Ave., Los Angeles, Calif. 90019
[21] Appl. No.: 831,189
[22] Filed: Sep. 7, 1977
[51] Int. Cl.² ............................................. B62d 21/14
[52] U.S. Cl. ................................... 280/647; 280/648; 280/650; 297/255
[58] Field of Search ................... 280/38, 39, 641, 642, 280/643, 644, 42, 647, 648, 649, 650, 657, 658, 47.38, 47.39; 297/255, 256, 64

[56] References Cited
U.S. PATENT DOCUMENTS

| 1,027,483 | 5/1912 | Kaplan | 280/39 |
| 1,124,151 | 1/1915 | Lloyd | 280/39 |
| 1,124,153 | 1/1915 | Lloyd | 280/39 |
| 2,872,203 | 2/1959 | Hedstrom | 280/643 |
| 3,390,893 | 7/1968 | MacLaren | 280/39 |

Primary Examiner—Robert R. Song
Attorney, Agent, or Firm—William P. Green

[57] ABSTRACT

A stroller having side frame sections which are adapted to fold longitudinally and also laterally toward and away from one another, with a flexible seat and a flexible seat back extending therebetween, and with preferably transparent side panels extending vertically from the seat back to the side sections of the frame, to retain a child between the side panels both in a downwardly retracted generally horizontal position of the seat back and in upper variously inclined positions thereof.

10 Claims, 9 Drawing Figures

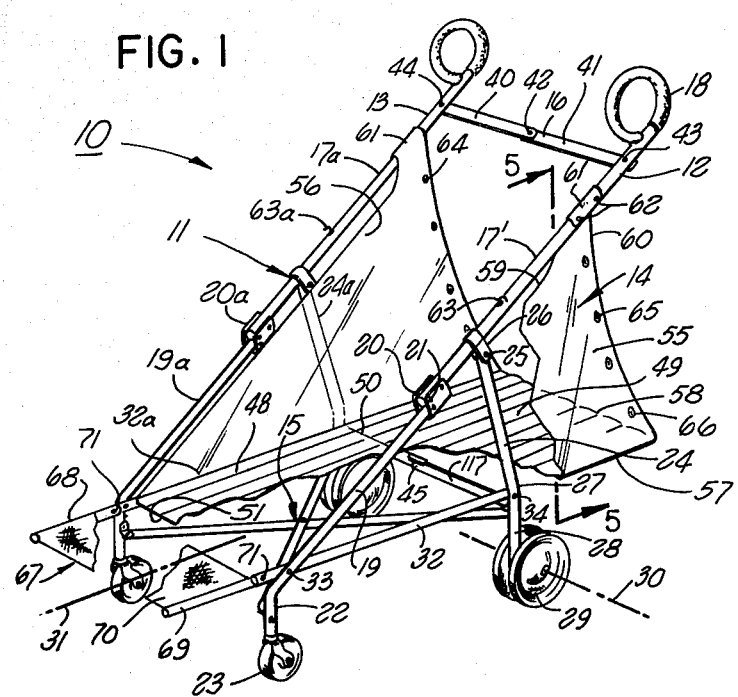
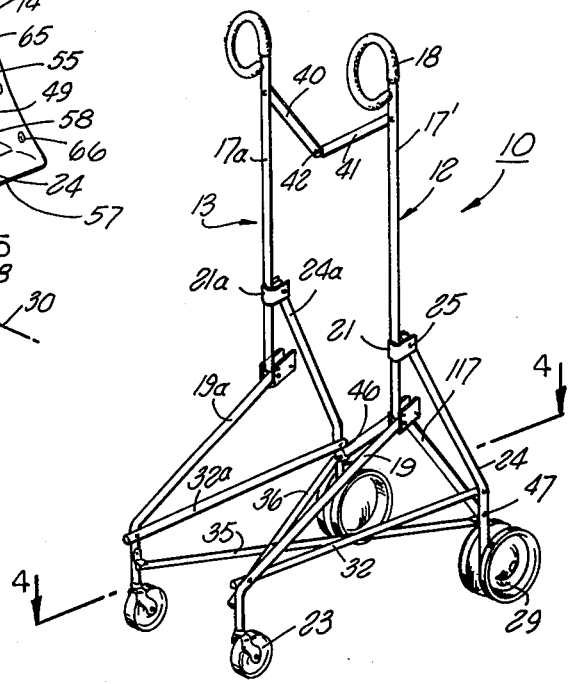
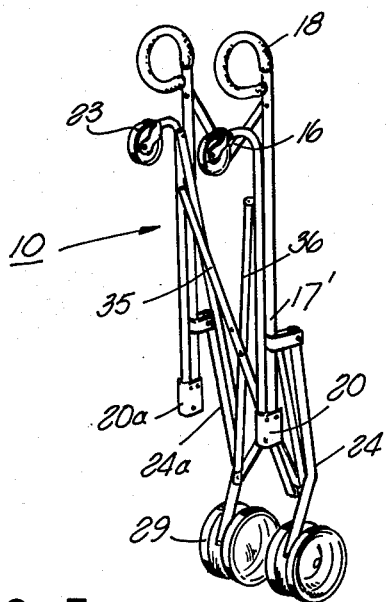
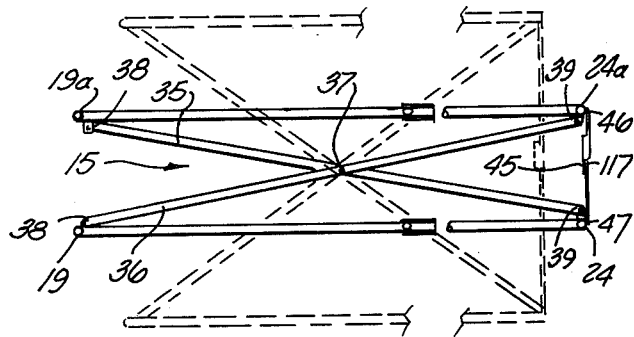

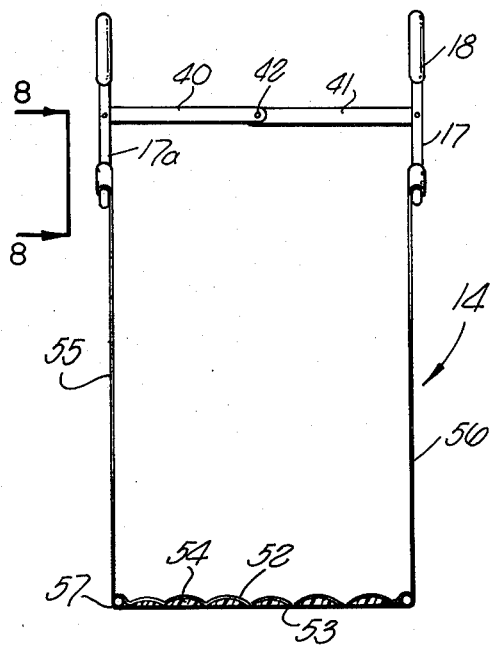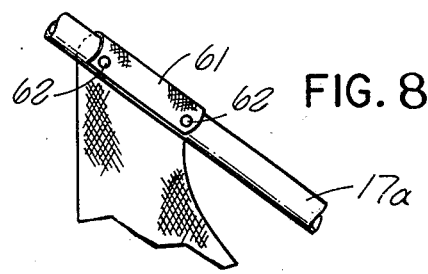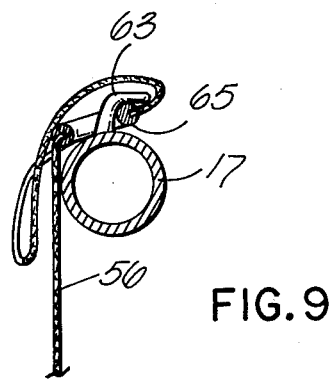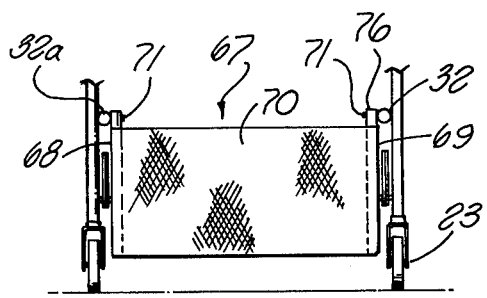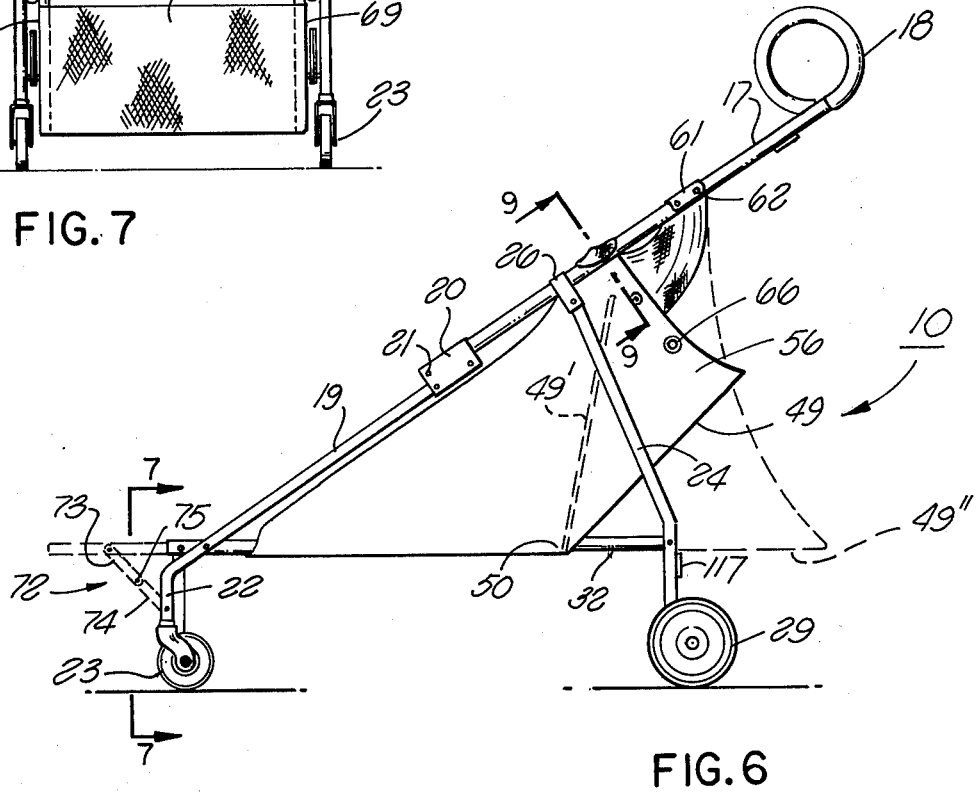

COLLAPSIBLE STROLLER

BACKGROUND OF THE INVENTION

This invention relates to improved collapsible strollers of a type adapted to carry a child effectively in various sitting positions and in a horizontally reclining position.

A stroller embodying the invention is of a known general type in which two foldable side frame sections carry flexible seat material extending laterally therebetween, and are foldable longitudinally to reduce the length of the stroller and laterally to bring the side sections toward and away from one another and reduce its width. Upon such longitudinal and lateral folding movement, the seat material flexes as necessary to avoid interference with the folding action.

One difficulty with this type of collapsible stroller is that it can support the child in only a sitting position, and can not be used for transporting the child in a reclining position. Consequently, the stroller is not adapted for use with very small infants, and is not satisfactory for use with older children when they become tired and wish to lie back in horizontal condition.

SUMMARY OF THE INVENTION

The present invention provides improvements in a collapsible stroller of the discussed type, adapting the stroller for effective support of a child's back in a plurality of different positions, including a generally upright sitting position, and preferably also including a generally horizontal reclining position. In addition, the unit may be adapted for supporting the back in one or more intermediate inclined positions, and all of this is accomplished in a manner avoiding interference with folding of the frame structure to fully collapsed condition.

To achieve these results, I provide a pair of side panels which are connected at lower ends to the seat back and at upper ends to the side sections of the frame of the stroller, and which extend between the seat back and frame sections in any of different positions to retain the child laterally in those different settings. In conjunction with the side panels, means are provided for supporting the seat back from the side sections in the different settings. These supporting means may include first connectors attached to the side sections of the frame, and second connectors carried by the side panels at spaced locations and detachably securable to the first connectors to support the seat back by forces transmitted through the side panels in the different settings of the back. The first connectors may take the form of hooks attached to the side sections of the frame, and the second connectors may take the form of eyes selectively attachable to the hooks.

BRIEF DESCRIPTION OF THE DRAWINGS

FIG. 1 is perspective view showing a stroller embodying the invention and shown in a condition for supporting a child in horizontally reclining position;

FIG. 2 is a perspective showing the stroller as it is being folded toward collapsed condition;

FIG. 3 shows the stroller fully collapsed;

FIG. 4 is a horizontal section in diagrammatic form taken on line 4—4 of FIG. 2;

FIG. 5 is a vertical section taken on line 5—5 of FIG. 1;

FIG. 6 is a side view of the stroller in its open condition, and illustrating the seat back in full lines in an inclined position, with other settings of the seat back being shown in broken lines;

FIG. 7 is a fragmentary front elevational view of the foot support taken on line 7—7 of FIG. 6;

FIG. 8 is a fragmentary side elevational view taken on line 8—8 of FIG. 5; and

FIG. 9 is a fragmentary section taken on line 9—9 of FIG. 6.

Detailed Description of the Preferred Embodiment

With reference first to FIG. 1, the stroller 10 has a collapsible frame 11 including two similar left and right side sections 12 and 13 between which there extends flexible material 14 forming a seat and back rest assembly. The two opposite side sections 12 and 13 of the frame are foldable longitudinally as seen in FIG. 2, and also are interconnected by a lower scissors type link assembly 15 for movement laterally toward one another into close proximity to reduce the width of the stroller in folded condition. Two foldable braces 16 and 117 are provided to lock the frame elements in their open condition.

To describe the left side frame section 12 in greater detail, this section includes an upper rigid tubular member 17' which in the FIG. 1 open condition of the stroller extends at an inclination upwardly and rearwardly, and whose upper extremity is curved back to form a handle loop 18 by which a user may push and manipulate the stroller. At its lower end, tube 17' is connected pivotally to a second tubular member 19 of the left hand frame section 12, with this connection typically being formed by rigid connection of a bracket element 20 to the upper end of tube 19, and by pivotal connection of tube 17' to bracket 20 at 21. The axis of the pivotal connection 21 extends horizontally, and transversely of the connected elements 17' and 19, so that in the folded condition of FIG. 3 the tubes 17' and 19 extend essentially parallel and closely adjacent one another. At its forward end, tube 19 has a downwardly turned portion 22, which carries a caster assembly 23 adapted to engage and roll along a supporting surface.

In addition to the elements 17' and 19, the left side section 12 of the frame includes also a rigid tubular member 24, whose upper end is pivotally connected at 25 to a bracket 26 rigidly secured to member 17' at a location spaced above the pivotal connection 21. The axis of connection 25 is essentially horizontal and essentially parallel to the axis of the previously mentioned pivotal connection 21. From the location of pivotal point 25, member 24 extends downwardly and rearwardly to a point 27, at which it is turned directly downwardly at 28 to carry a pair of spaced ground engaging wheels 29 turning about a common horizontal axis 30 extending transversely of the main front to rear axis 31 of the stroller.

The elements 19 and 24 are further interconnected by a rigid tubular member 32, which in the FIG. 1 condition of the stroller extends horizontally and parallel to the front to rear axis 31. This member 32 is pivoted at a location 33 near its forward end to member 19, and at its rear end 34 to member 24, with the pivotal axes at the locations 33 and 34 extending parallel to one another and to the axes at locations 21 and 25, and transversely of the front to rear axis 31.

The right side section 13 of the frame is constructed the same as the above discussed left side section 12, and will be understood from the specific description of section 12 without a similarly detailed description of section 13. Suffice it to say merely that right section 13 includes frame elements 17a, 19a, 20a, 24a and 32a all constructed the same as and pivotally interconnected in the same fashion as the corresponding elements 17', 19, 20, 24 and 32 of section 12. Also, the pivotal connections in the right section 13 at locations corresponding to the pivotal joints 21, 25, 33 and 34 of the left section have the same horizontal pivotal axes as those connections 21, 25, 33 and 34 respectively. The two sections 12 and 13 can thus fold longitudinally in precisely the same manner and in unison, as brought out in FIGS. 2 and 3.

Referring now to FIG. 4, the right and left hand sections are interconnected for movement laterally toward and away from one another by the scissors connection 15, which includes two similar elongated links 35 and 36, connected at their centers for relative pivotal movement about a vertical axis 37, and each pivotally interconnected at its forward end 38 to a corresponding one of the frame elements 19 or 19a, and at its rear end 39 to the element 24 or 24a at the opposite side of the stroller. The pivotal axes at the four locations 38, 38, 39 and 39 are vertical and parallel to the pivotal axis at the location 37, so that the links 35 and 36 can fold in scissors fashion from the fully opened broken line position of FIG. 4 through the partially folded full line position of that figure and to a fully folded position in which two side sections 12 and 13 of the frame are closely adjacent one another.

The brace or connector member 16 near handles 18 includes two links 40 and 41 which are pivoted at their outer ends to elements 17a and 17' respectively, and are pivotally connected at their inner ends 42 in a relation enabling the two links to fold as indicated in FIG. 2 to allow lateral collapsing movement of the two side sections 12 and 13 toward one another. In the extended condition of FIG. 1, the two links 40 and 41 are essentially aligned with one another, but with central pivot point 42 in a slightly overcenter position with respect to the outer pivot points 43 and 44, and with the pivotal connection 42 being sufficiently tight frictionally or appropriately detented to retain the elements 40 and 41 in this extended condition in which they form together a rigid brace holding sections 12 and 13 apart and in predetermined spaced relation. The lower brace assembly 117 is constructed the same as upper brace 16, being formed of two links pivotally interconnected at a central location 45 and pivotally connected at opposite ends 46 and 47 to members 24 and 24a respectively, to in the FIG. 1 condition hold lower portions of the side frame sections 12 and 13 rigidly in a predetermined spaced relation, while at the same time allowing these sections to be brought together by manual breaking of the pivotal connection at 45 when desired.

Most of the frame structure thus far described has been utilized before in strollers currently on the market. In those prior strollers, however, the elements 32 and 32a do not extend horizontally but rather are inclined upwardly as they extend forwardly and the upper brace member 16 is not provided, nor are casters utilized at the front of the device. In addition, the handles of the previously marketed item are formed differently.

A primary feature of the present invention resides in the unique structure of the flexible portion 14 of the device which actually supports the child in the stroller. In my arrangement, this flexible section of the stroller includes a padded seat 48 which in the open condition of the stroller extends horizontally, and a padded seat back section 49 which swings upwardly and downwardly relative to seat 48 along a horizontal transverse fold or hinge line 50 and between the upwardly projecting position 49' of FIG. 6 and the downwardly swung position 49" in which the seat back is aligned with and forms essentially a horizontal continuation of seat 48. Along its opposite side edges, seat 48 is connected to the side frame elements 32 and 32a respectively, by doubling back the cloth forming seat 48 to extend about elements 32 and 32a along the entire front to rear extent of the seat from its front edge 51 to the location of the fold or hinge line 50. As will be apparent from FIG. 5, both the seat and seat back portions of the flexible material may be formed of two upper and lower sheets of cloth or other flexible material 52 and 53, having padding 54 confined therebetween.

Extending upwardly from the opposite side edges of the seat and back elements 48 and 49, there are provided two side panels 55 and 56, which may be essentially triangular in shape, and are formed of an appropriate flexible sheet material which is desirably transparent to allow a child to see laterally through these panels. For example, panels 55 and 56 may be formed of an appropriate transparent resinous plastic film material, such as a vinyl plastic or polyethylene, or the like, of a thickness having sufficient strength to support the seat back. The lower edge 57 of each of the side panels is straight and extends horizontally in the FIG. 1 condition of the stroller, and is connected continuously to the edge of seat 48 and back 49 along the entire front to rear extent of the panel from the front edge 51 of the seat to the rear edge 58 of the seat back. This connection may be made by appropriately stitching or otherwise securing the side panel to the seat and back material along their edges. In extending upwardly from the location of attachment to the seat and seat back, each side panel 55 or 56 is defined by upwardly converging front and rear edges 59 and 60, the first of which extends generally along and closely adjacent to members 17' and 19 or 17a and 19a, and the second of which extends upwardly and slightly forwardly to an upper reduced width end 61 of the side panel which is wrapped around member 17' or 17a from the inside out, and is permanently and fixedly secured to member 17' or 17a by rivets or other fasteners 62. The side panels are so dimensioned that, when the panels extend directly vertically as seen in FIGS. 1 and 5, the connection of the upper end of the panels at 62 to the upper portions of the frame serves to suspend the side panels and the seat back 49 from frame elements 17' and 17a in a condition in which the seat back is directly horizontal and aligned horizontally with seat 48.

For supporting the seat back in other upwardly inclined positions, members 17' and 17a carry hook elements 63 and 63a, which are rigidly secured to the corresponding elements 17' or 17a, and project upwardly a short distance therefrom and then laterally outwardly as seen in FIG. 9. At a series of locations spaced along its rear edge 60, each of the side panels 55 or 56 carries a series of metal eye elements or loops 64, 65 and 66, with the eyes of one side panel being aligned horizontally with the corresponding eyes of the other side panel, and with these eyes being dimensioned to be received about and thereby connect to hooks 63 and 63a as seen in FIG. 9. When the lowermost eyes 66 are secured to the hooks, the side panels hold seat back 49 in its uppermost generally vertical position represented at 49' in FIG. 6. When the next pair of eyes 65 are connected to the hooks, the side panels suspend the seat back in a first rearwardly inclined position, as represented in full lines in FIG. 6. Engagement of the next set of eyes 64 with the hooks suspends the seat back in a second and lower inclined position.

At the front of the seat, there is provided a foot or leg susport 67 (FIG. 1 and 7), which includes two parallel rigid opposite side elements 68 and 69 between which a cloth or other sheet of flexible material 70 extends, with the elements 68 and 69 being pivoted at 71 to members 32 and 32a to swing downwardly and upwardly between the horizontally extending broken line position of FIG. 6 and the depending full line position of that figure. Two folding brace units 72 are provided to releasably hold the two rigid elements 68 and 69 in their upper horizontal position, with each of these brace assemblies including two links 73 and 74 pivotally connected to one another at 75 and pivotally connected at their second ends to corresponding element 68 or 69 and portions 22 of elements 19 and 19a. In their broken line supporting positions of FIG. 6, the links of the brace assembly 72 are slightly overcenter with respect to one another to provide rigid braces holding the foot rest in its horizontal condition in which it is aligned horizontally with and forms in effect a continuation of the seat 48 and seat back 49 when horizontal.

To describe briefly the manner of use of the stroller, assume that the stroller is initially in the fully collapsed condition of FIG. 3. When it is to be opened, a user merely grasps elements 18 and 19 or 19a to swing them in unison from their folded positions of FIG. 3 through the FIG. 2 condition and to the open condition of FIG. 1. The relative positioning of the different axes 21, 25, 33 and 34 is such that the swinging movement of elements 17' and 17a relative to members 19 and 19a causes the pivotal connections 34 and 34a to move relatively toward one another, to thereby bring the front pivotal connections 38 of FIG. 4 rearwardly relative to the rear pivotal connections 39, causing the scissors type linkage 15 to automatically open to the broken-line laterally spread condition of FIG. 4. The links of the various pivotally interconnected parts and the positioning of the various pivotal connections is predetermined to obtain this automatic opening action, in a manner similar to that accomplished in the above discussed prior art device now on the market. After the elements 17', 17a, 19 and 19a have been swung to their FIG. 1 opened conditions, the braces 16 and 117 are manually pressed to slightly overcenter locked condition to secure the side sections 12 and 13 in the desired spread condition, and hold the frame in its open setting.

If it is desired to utilize the stroller with an infant or child lying horizontally in the stroller, the side panels are allowed to fall downwardly to their fully extended condition of FIG. 1, in which seat back 49 and foot rest 70 form together an extended horizontal surface on which the child may lie. The transparent side panels allow the child to see out when in that condition, and permit the parent to see in. When it is desired to support the seat back in one of its inclined positions or in its most directly upright position of 49' of FIG. 6, the side panels are pulled upwardly far enough to permit attachment of a selected pair of the eyes 64, 65 or 66 on the side panels to hooks 63 and 63a of the side panels, to thus suspend the weight of the seat back and a child leaning against the seat back in the desired inclined or more directly vertical position. In any of these selected settings of the seat back, the foot rest 70 may be either left in its horizontal position or released to swing downwardly to the inactive vertical position of FIG. 6.

Though a typical embodiment of the invention has been described in detail, it will of course be understood that the invention is not to be considered as limited to this particular form, but includes in addition all variations falling within the scope of the appended claims.

I claim:

1. A stroller comprising:

two opposite side sections each having a pair of wheels at its lower end and an upper end portion by which a person manipulates the stroller;

said sections being foldable longitudinally to a reduced length condition;

means connecting said two sections for movement laterally toward and away from one another between collapsed positions in close proximity to one another and more widely laterally spaced positions of use;

flexible material forming a seat extending between said two side sections, and forming also a seat back which can swing between a generally upright position for supporting the back of a sitting child and a downwardly and rearwardly swung more horizontal position for supporting a child lying more horizontally;

two flexible opposite side panels connected to opposite edges of said seat back and extending upwardly therefrom to said two side sections respectively to retain a child leaning against the seat back in a plurality of different positions thereof; and means for supporting said seat back in said different positions with said side panels extending between the seat back and side sections.

2. A stroller as recited in claim 1, in which said side panels are formed of transparent sheet material.

3. A stroller as recited in claim 1, in which said supporting means include a plurality of fasteners secured to said side panels at spaced locations and detachably connectable to said side sections to support the seat back through the side panels in said different positions of the seat back.

4. A stroller as recited in claim 1, in which said supporting means include first connector elements attached to said side sections, and second connector elements attached to said side panels and detachably connectable to said first connector elements in a relation supporting the seat back through said side panels in different positions of the seat back.

5. A stroller as recited in claim 1, in which said side panels have upper ends permanently connected to said side sections at locations to support the seat back in generally horizontal position through the side panels, there being connector elements on said side panels at spaced locations detachably connectable to said side sections in a relation supporting the seat back through the side panels in at least one upwardly swung position of the seat back.

6. A stroller as recited in claim 1, in which said supporting means are adapted to support the seat back in a generally upright position and in at least one intermediate inclined position.

7. A stroller as recited in claim 1, in which said supporting means include a pair of hooks attached to said side sections respectively, and eyes carried by said side panels near rear edges thereof at locations spaced along said edges and selectively and detachably connectable to said hooks to support the seat back in differently inclined positions.

8. A stroller as recited in claim 1, in which said side panels are formed of flexible transparent sheet material connected along a lower edge of each side panel to a corresponding side edge of the seat back, said supporting means including means attaching upper ends of said flexible transparent side panels at fixed locations to said side sections respectively, first fasteners attached to said side sections, and second fasteners carried by rear edge portions of said flexible transparent panels at locations spaced along said edges and engageable with said first connectors to support the seat back through said side panels in an essentially upright position and in intermediate inclined positions.

9. A stroller as recited in claim 8, including a front section having rigid side elements connected to said side sections near the front of said seat and having a flexible panel extending between said elements, and means mounting said front section for swinging movement between a generally horizontal position forming a forward extension of the seat and a downwardly swung retracted position.

10. A stroller as recited in claim 1, including a front section having rigid side elements connected to said side sections near the front of said seat and having a flexible panel extending between said elements, and means mounting said front section for swinging movement between a generally horizontal position forming a forward extension of the seat and a downwardly swung retracted position.

* * * * *